United States Patent
Tanaka

(10) Patent No.: US 10,902,725 B2
(45) Date of Patent: Jan. 26, 2021

(54) VEHICLE CONTROL DEVICE

(71) Applicant: HITACHI AUTOMOTIVE SYSTEMS, LTD., Hitachinaka (JP)

(72) Inventor: Hideaki Tanaka, Ibaraki (JP)

(73) Assignee: HITACHI AUTOMOTIVE SYSTEMS, LTD., Hitachinaka (JP)

(*) Notice: Subject to any disclaimer, the term of this patent is extended or adjusted under 35 U.S.C. 154(b) by 108 days.

(21) Appl. No.: 16/076,055

(22) PCT Filed: Jan. 31, 2017

(86) PCT No.: PCT/JP2017/003261
§ 371 (c)(1),
(2) Date: Aug. 7, 2018

(87) PCT Pub. No.: WO2017/163614
PCT Pub. Date: Sep. 28, 2017

(65) Prior Publication Data
US 2020/0098266 A1   Mar. 26, 2020

(30) Foreign Application Priority Data

Mar. 25, 2016   (JP) ................. 2016-062302

(51) Int. Cl.
*G05D 1/00* (2006.01)
*G08G 1/16* (2006.01)
(Continued)

(52) U.S. Cl.
CPC ......... *G08G 1/161* (2013.01); *B60W 30/0956* (2013.01); *B60W 30/16* (2013.01);
(Continued)

(58) Field of Classification Search
CPC ........ G08G 1/161; G08G 1/167; G08G 1/095; G08G 1/0967; B60W 30/16;
(Continued)

(56) References Cited

U.S. PATENT DOCUMENTS 8,532,862 B2 * 9/2013 Neff ................. G05D 1/0246
                                                    701/25
9,779,628 B2 * 10/2017 Yamashiro ............ B60W 10/18
(Continued)

FOREIGN PATENT DOCUMENTS

JP   2008-129804 A   6/2008
JP   2008-129839 A   6/2008
(Continued)

OTHER PUBLICATIONS

Supplementary European Search Report issued in corresponding European Patent Application No. 17769661.4 dated Oct. 24, 2019.
(Continued)

*Primary Examiner* — An T Nguyen
(74) *Attorney, Agent, or Firm* — Foley & Lardner LLP

(57) ABSTRACT

A problem to be addressed by the present invention is to obtain a vehicle control device which, while alleviating an excessive computation load, is capable of appropriately ascertaining an external environment. This vehicle control device 01 comprises an other vehicle information acquisition unit 02 which acquires information of another vehicle by communication, and an exterior recognition unit 03 which carries out recognition of the exterior of a host vehicle by sensing. The exterior recognition unit 03 senses an other vehicle vicinity space in the vicinity of the other vehicle on the basis of the information of the other vehicle which is acquired by the other vehicle information acquisition unit 02.

11 Claims, 8 Drawing Sheets

(51) Int. Cl.
  *B60W 30/095* (2012.01)
  *B60W 30/16* (2020.01)
  *B60W 40/04* (2006.01)
(52) U.S. Cl.
  CPC ............. *B60W 40/04* (2013.01); *G08G 1/167* (2013.01); *B60W 2554/801* (2020.02)
(58) Field of Classification Search
  CPC ............. B60W 30/0956; B60W 40/04; B60W 2554/801; B60W 30/188; B60W 40/107
  See application file for complete search history.

(56) References Cited

U.S. PATENT DOCUMENTS

| | | | |
|---|---|---|---|
| 9,870,003 B2* | 1/2018 | Neff | G05D 1/0285 |
| 10,106,163 B2* | 10/2018 | Fujiki | B60W 10/04 |
| 2006/0235597 A1* | 10/2006 | Hori | G08G 1/096758 |
| | | | 701/96 |
| 2007/0150196 A1* | 6/2007 | Grimm | B60T 7/22 |
| | | | 701/301 |
| 2008/0125972 A1* | 5/2008 | Neff | B60W 40/02 |
| | | | 701/300 |
| 2010/0042282 A1 | 2/2010 | Taguchi et al. | |
| 2011/0035116 A1* | 2/2011 | Ieda | G08G 1/166 |
| | | | 701/45 |
| 2011/0184605 A1* | 7/2011 | Neff | G05D 1/0255 |
| | | | 701/25 |
| 2013/0099911 A1* | 4/2013 | Mudalige | G08G 1/166 |
| | | | 340/438 |
| 2013/0158852 A1 | 6/2013 | Stahlin et al. | |
| 2014/0107867 A1* | 4/2014 | Yamashiro | G05D 1/0293 |
| | | | 701/2 |
| 2014/0195093 A1* | 7/2014 | Litkouhi | B60W 30/16 |
| | | | 701/23 |
| 2015/0010212 A1* | 1/2015 | Segarra | G08G 1/09626 |
| | | | 382/104 |
| 2015/0109147 A1* | 4/2015 | Stahlin | G08G 1/096791 |
| | | | 340/907 |
| 2015/0153184 A1 | 6/2015 | Mudalige et al. | |
| 2015/0286754 A1* | 10/2015 | Stahlin | H04L 69/22 |
| | | | 703/6 |
| 2016/0049079 A1* | 2/2016 | Ibrahim | G01S 19/49 |
| | | | 340/944 |
| 2016/0214612 A1* | 7/2016 | Kashiba | B60W 30/18163 |
| 2016/0231747 A1* | 8/2016 | Neff | G05D 1/0231 |
| 2016/0358479 A1* | 12/2016 | Riedelsheimer | G08G 1/0145 |
| 2017/0053530 A1* | 2/2017 | Gogic | H04L 67/12 |
| 2017/0066374 A1* | 3/2017 | Hoye | B60W 30/08 |
| 2017/0158199 A1* | 6/2017 | Pallett | B60W 30/188 |
| 2017/0193822 A1* | 7/2017 | Song | H04W 4/12 |
| 2017/0197626 A1* | 7/2017 | Jammoussi | G08G 1/22 |
| 2019/0045474 A1* | 2/2019 | Li | H04W 56/0045 |

FOREIGN PATENT DOCUMENTS

| | | |
|---|---|---|
| JP | 2011-048456 A | 3/2011 |
| JP | 2015-005113 A | 1/2015 |
| JP | 2015-212115 A | 11/2015 |

OTHER PUBLICATIONS

International Search Report with English translation and Written Opinion issued in corresponding application No. PCT/JP2017/003261 dated Apr. 18, 2017.

* cited by examiner

VEHICLE CONTROL DEVICE

TECHNICAL FIELD

The present invention relates to a vehicle control device for merging from a merging lane to a main lane by automatic driving.

BACKGROUND ART

There is a known traveling support device that sets an appropriate acceleration of a host vehicle on the basis of a traveling state of another vehicle on a main lane when merging from a merging lane to the main lane on a highway or the like (PTL 1).

Meanwhile, existing methods for acquiring external environment information related to the host vehicle include an acquisition method by communication and an acquisition method by a sensor mounted on the host vehicle (PTL 2).

CITATION LIST

Patent Literature

PTL 1: JP 2011-048456 A
PTL 2: JP 2008-129804 A

SUMMARY OF INVENTION

Technical Problem

In PTL 1, however, in actually merging, there is a problem of grasping actions of vicinity vehicles and checking whether there is an available space for the host vehicle to safely merge, in addition to perform acceleration to an appropriate speed.

Each of the methods of PTL 2 includes the following advantages and disadvantages.

For example, the method of acquiring external environment information by communication has an advantage that relatively high accuracy and reliability of information can be expected in terms of being objective information. This method, however, has a disadvantage that information might not be acquired as a matter of course in a case where an object present in the external environment is not compatible with communication.

On the other hand, the method of acquiring external environment information by a sensor has an advantage that information can be acquired irrespective of whether an object present in the vicinity is compatible with communication. This method, however, has a disadvantage of causing a concern about accuracy or reliability of information because the information is obtained by the sensor mounted on the host vehicle and thus is not objective information. There is another disadvantage of an increase in the computation load in order to enhance sensing accuracy of the sensor.

An object of the present invention to provide a vehicle control device that can take advantage of the above two methods to appropriately grasp the external environment while suppressing an excessive computation load.

Solution to Problem

In order to solve the above problem, a vehicle control device according to the present invention comprises an other vehicle information acquisition unit that acquires information of another vehicle by communication; and an exterior recognition unit that carries out recognition of the exterior of a host vehicle by sensing. The exterior recognition unit senses an other vehicle vicinity space in the vicinity of the other vehicle on the basis of the information of the other vehicle acquired by the other vehicle information acquisition unit.

Advantageous Effects of Invention

According to the present invention, it is possible to accelerate to a necessary speed to support merging, further confirm safety, and perform vehicle control for merging.

Further features related to the present invention will become apparent from the description of this description and the accompanying drawings. Problems, configurations, and effects other than in the above description will become apparent by the following embodiments.

DESCRIPTION OF EMBODIMENTS

Embodiments of the present invention will be described below with reference to the accompanying drawings.

First Example

Figure 1:
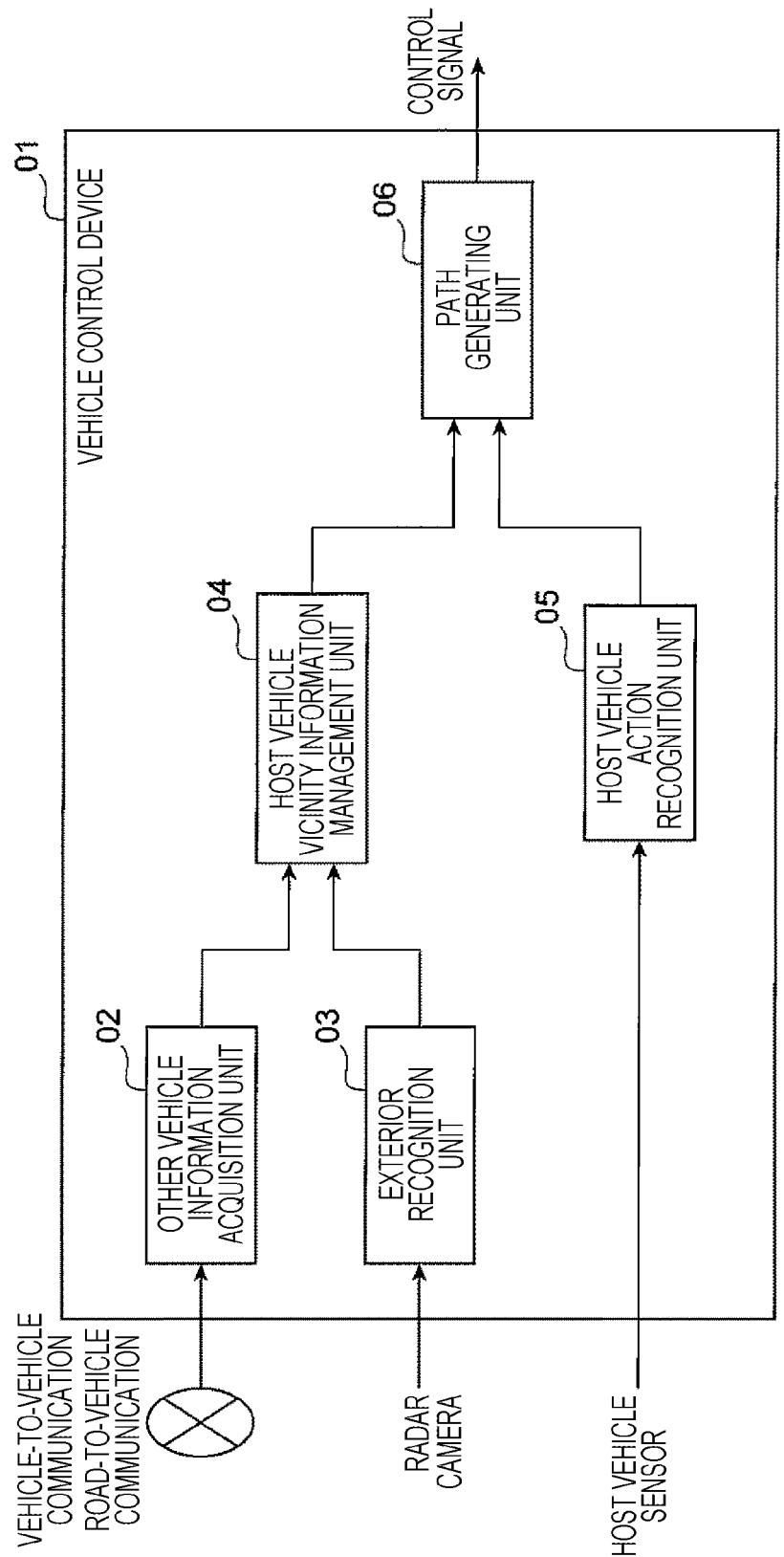
FIG. 1 is a diagram illustrating a configuration example of an in-vehicle system using a vehicle control device according to the present invention.

FIG. 1 illustrates a block diagram of a vehicle control device. A vehicle control device 01 includes an other vehicle information acquisition unit 02 that performs communication (C2X) such as vehicle-to-vehicle communication (C2C) and road-to-vehicle communication (C2I), an exterior recognition unit 03 that acquires information situation of vehicles in the vicinity of the host vehicle and roads from various sensors such as a radar and a camera, a host vehicle vicinity information management unit 04 that integrates the information from the other vehicle information acquisition unit 02 and the information from the exterior recognition unit 03 to manage the situation of vehicles in the vicinity of the host vehicle and the roads; a host vehicle action recognition unit 05 that senses states of the host vehicle such as position, speed, acceleration, and a yaw rate, and a path generating unit 06 that determines a path of the host vehicle on the basis of information from the host vehicle vicinity information management unit 04 and the host vehicle action recognition unit 05.

The other vehicle information acquisition unit 02 acquires information of another vehicle by communication (C2X). The other vehicle information acquisition unit 02 acquires vicinity vehicle action information (information of other vehicles) such as position, speed, acceleration, and yaw rate by vehicle-to-vehicle communication (C2C). That is, vehicle information transmitted from the other vehicle is acquired by vehicle-to-vehicle communication. In addition, the other vehicle information acquisition unit uses road-to-vehicle communication (C2I) to acquire information such as the position, speed, and acceleration of a vehicle traveling on a road (information of other vehicle) acquired on a roadside device by analyzing information from sensors such as radar and cameras. That is, the information of other vehicles transmitted from on-road equipment is acquired by road-to-vehicle communication. The other vehicle information acquisition unit 02 acquires information of the other vehicle present in an other vehicle information sensing range A2 in 300 m to 500 m vicinity of the host vehicle, for example. Examples of the other vehicle include a vehicle traveling on a road merging into the road on which the host vehicle travels, and a vehicle traveling on an adjacent lane of the lane on which the host vehicle travels. There are three patterns of communication (C2X) in the present Example as follows: (1) vehicle-to-vehicle communication (C2C) alone; (2) both vehicle-to-vehicle communication and road-to-vehicle communication (C2C+C2I); and (3) road-to-vehicle communication (C2I) alone.

The vehicle-to-vehicle communication and the road-to-vehicle communication are performed using a cooperative awareness message (CAM). The CAM is a message used mainly for safety system services of cooperative ITS, and is exchanged between ITS stations (ITS-S) to build and maintain mutual recognition and support cooperativeness in road networks. The CAM includes state information and attribute information of the source ITS-S, and includes different information depending on the type of ITS-S. In the vehicle ITS-S, the state information includes time, position, and operation state, while the attribute information includes data on dimensions, vehicle type, and role in the road traffic or the like. A receiving ITS-S can recognize existence of a source ITS-S and can acquire the type and the state of the source ITS-S by CAM reception. A CAM parameter includes a basic container, a vehicle ITS-S container, and a special vehicle container. The basic container describes the type of the source ITS-S and the latest geographical position of the source ITS-S as basic information of the source ITS-S. The vehicle ITS-S container includes high frequency containers and low frequency containers. The high frequency container describes dynamic state information of the vehicle ITS-S such as direction, speed and acceleration, while the low frequency container describes container divisions of special vehicles and external lights. The special container is a container for a vehicle ITS-S having a special role in the road traffic such as public transportation.

The exterior recognition unit 03 recognizes the exterior of the host vehicle by sensing. The exterior recognition unit 03 is capable of acquiring the relative position and the state of vehicles, obstacles, road signs or the like in the vicinity of the host vehicle from sensors such as cameras and radars mounted on the host vehicle. The exterior recognition unit 03 can recognize an exterior recognition sensing range A1 in 70 m to 100 m vicinity of the host vehicle, for example. The exterior recognition unit 03 can sense the other vehicle and sense the other vehicle vicinity space in the vicinity of the other vehicle on the basis of the information of the other vehicle acquired by the other vehicle information acquisition unit 02.

While the exterior recognition unit 30 also senses and confirms an object such as the other vehicle existence of which is already known by communication (C2X), priority is given to the sensing of the space in the vicinity of the object over the sensing of the object existence of which is already known by communication. Furthermore, intensive sensing is performed for the space in the vicinity of the object. More precise sensing is performed by for example, increasing the frequency of processing toward the vicinity of the object more than the object existence of which is already known by communication (C2X), or by changing the resource, etc.

The host vehicle vicinity information management unit 04 integrates information from the other vehicle information acquisition unit 02 and information from the exterior recognition unit 03 and manages the integrated information as host vehicle vicinity information. Normally, the other vehicle information acquisition unit 02 can acquire information of vicinity vehicles and roads in the other vehicle information sensing range A2, which is a wider range than the exterior recognition sensing range A1 of the exterior recognition unit 03. Accordingly, the host vehicle vicinity information in the other vehicle information sensing range A2 is first acquired by the other vehicle information acquisition unit 02, and thereafter, the host vehicle vicinity information acquired by the other vehicle information acquisition unit 02 is matched against the information acquired by the exterior recognition unit 03 at a stage of entering the exterior recognition sensing range A1 of the exterior recognition unit 03. This configuration makes it possible to sense the host vehicle vicinity information with higher accuracy. Moreover, with execution of prioritization of the objects as sensing targets of the exterior recognition unit 03 on the basis of information acquired by the other vehicle information acquisition unit 02, for example, the characteristics and position of the vehicle, it is possible to more efficiently sense the host vehicle vicinity information.

The host vehicle action recognition unit 05 can acquire information such as the yaw rate, the wheel speed, the steering angle, the acceleration, representing the action of the host vehicle respectively from a gyro sensor, a wheel speed sensor, a steering angle sensor, an acceleration sensor, for example.

For example, at the time of merging from the merging lane to the main lane, the path generating unit 06 performs sensing for a mergeable space on the main lane into which the host vehicle can merge (an entry space that allows the host vehicle to enter) on the basis of the information from the host vehicle vicinity information management unit 04 and the information from the host vehicle action recognition unit 05, and determines a path for entering the mergeable space. Then, in accordance with the determined path, the path generating unit 06 transmits a control signal and performs vehicle control of the host vehicle in the longitudinal direction such as accelerator and the brake, and in the lateral direction such as steering.

Even after the path generating unit 06 first determines the path, the assumed mergeable space might change due to other vehicle's operation such as accelerating or decelerating or lane change. Therefore, the mergeable space is continuously sensed on the basis of the information from the host vehicle vicinity information management unit 04 and the host vehicle action recognition unit 05, and when there is a change in the mergeable space, the path is generated again.

Figure 2:
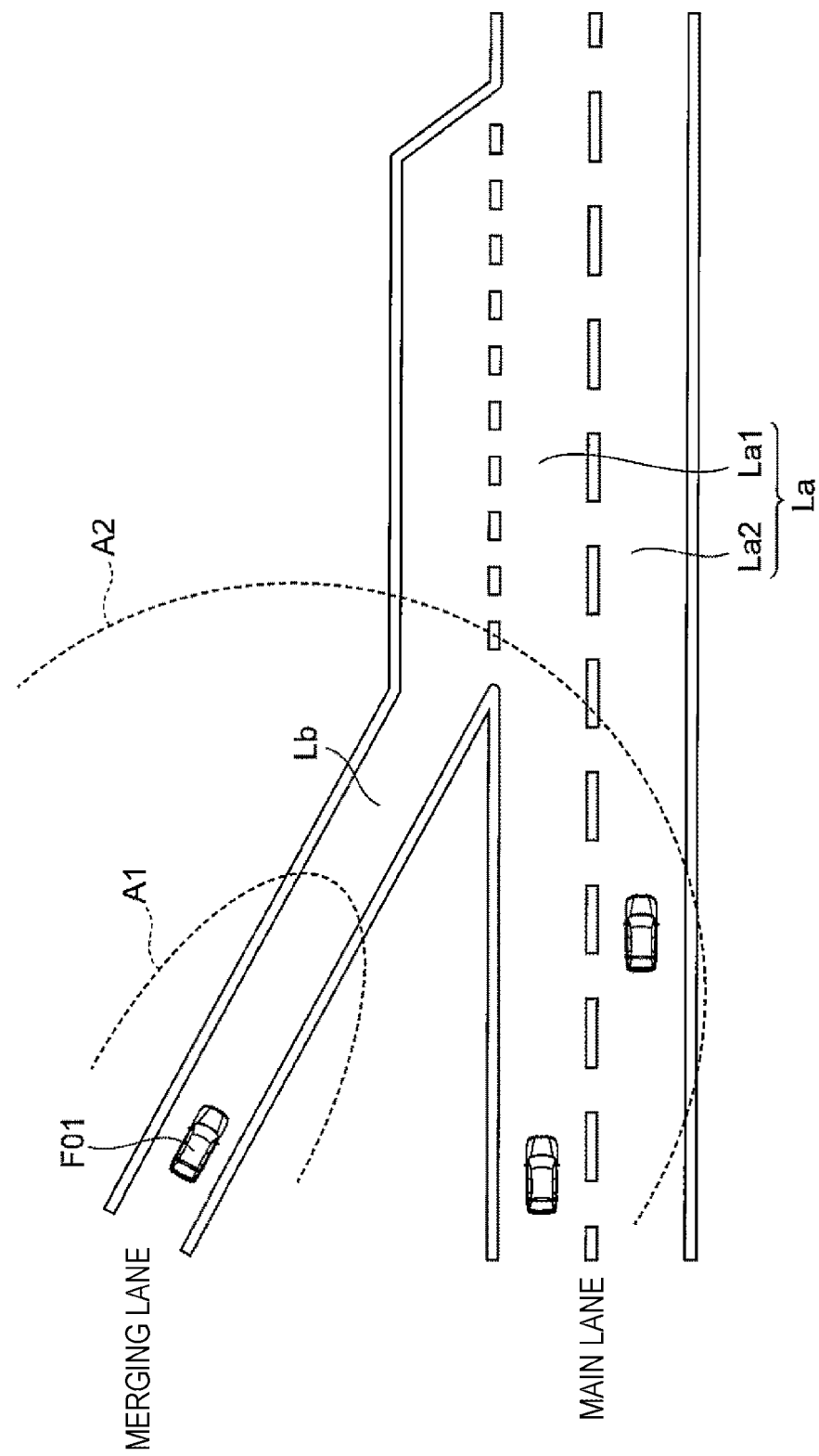
FIG. 2 is a diagram illustrating an example of a vehicle on a main lane, outside the exterior recognition range, according to the present invention.

Next, the specifics of control when the host vehicle merges into the main lane from the merging lane will be described. As illustrated in FIG. 2, a host vehicle F01 is traveling on a merging lane Lb. At a point where a main lane La is outside the sensing range A1 of the exterior recognition unit 03, other vehicles on the main lane La and road conditions are sensed by the information from the other vehicle information acquisition unit 02. In the state illustrated in FIG. 2, sensing of other vehicles by the exterior recognition unit 03 is not available.

From the action of other vehicles on the main lane La obtained here, a target speed of the host vehicle F01 is set to accelerate the host vehicle F01 so as to fit in the traffic stream of other vehicles on the main lane La. In a case where the other vehicle information acquisition unit 02 has difficulty in acquiring the information of the other vehicle on the main lane La by vehicle-to-vehicle communication or road-to-vehicle communication, the speed limit of the host vehicle F01 is set to the target speed to accelerate the host vehicle F01.

Figure 3:
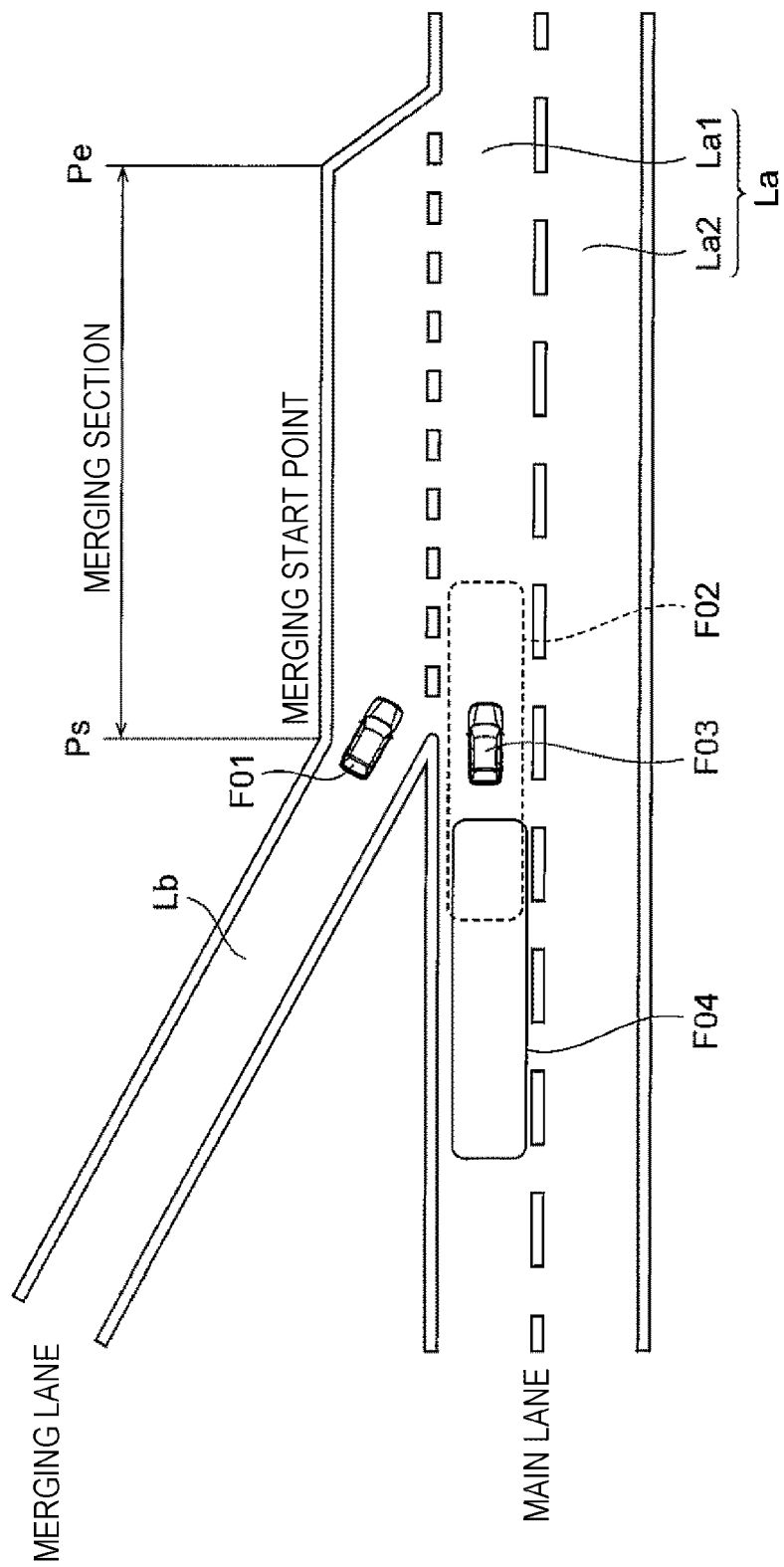
FIG. 3 is a diagram illustrating an example in which there is a vehicle to be an obstacle for merging in a mergeable space according to the present invention.

Subsequently, as illustrated in FIG. 3, when a merging start point Ps of the merging section is reached at the set speed, the exterior recognition unit 03 performs sensing to examine whether there is a practically mergeable space on the main lane La. In a case where there is mergeable space as a result of the sensing, the vehicle is accelerated to the set speed continuously.

In contrast, there might be a case where the sensing performed when the host vehicle F01 reaches the merging start point Ps has revealed that there is another vehicle F03 not compatible with the vehicle-to-vehicle communication in a space F02 that has been recognized as mergeable until that point by communication. At this time, the other vehicle F03 is an obstacle to hinder entry of the host vehicle F01 into the space F02 (other vehicle vicinity space), and thus would disable safe merging of the host vehicle F01 in this state. Accordingly, examination to check whether there is another mergeable space behind the other vehicle F03 is performed. Whether there is another space can be examined, for example, by sensing by the exterior recognition unit 03.

In the example illustrated in FIG. 3, a space F04 existing behind the vehicle F03 corresponds to the other mergeable space. At this time, the set speed of the host vehicle F01 is changed to enable merging into the other space F04. Furthermore, another mergeable space behind the space F04 and within the merging section is also searched for and listed as a candidate for a mergeable space.

Figure 4:
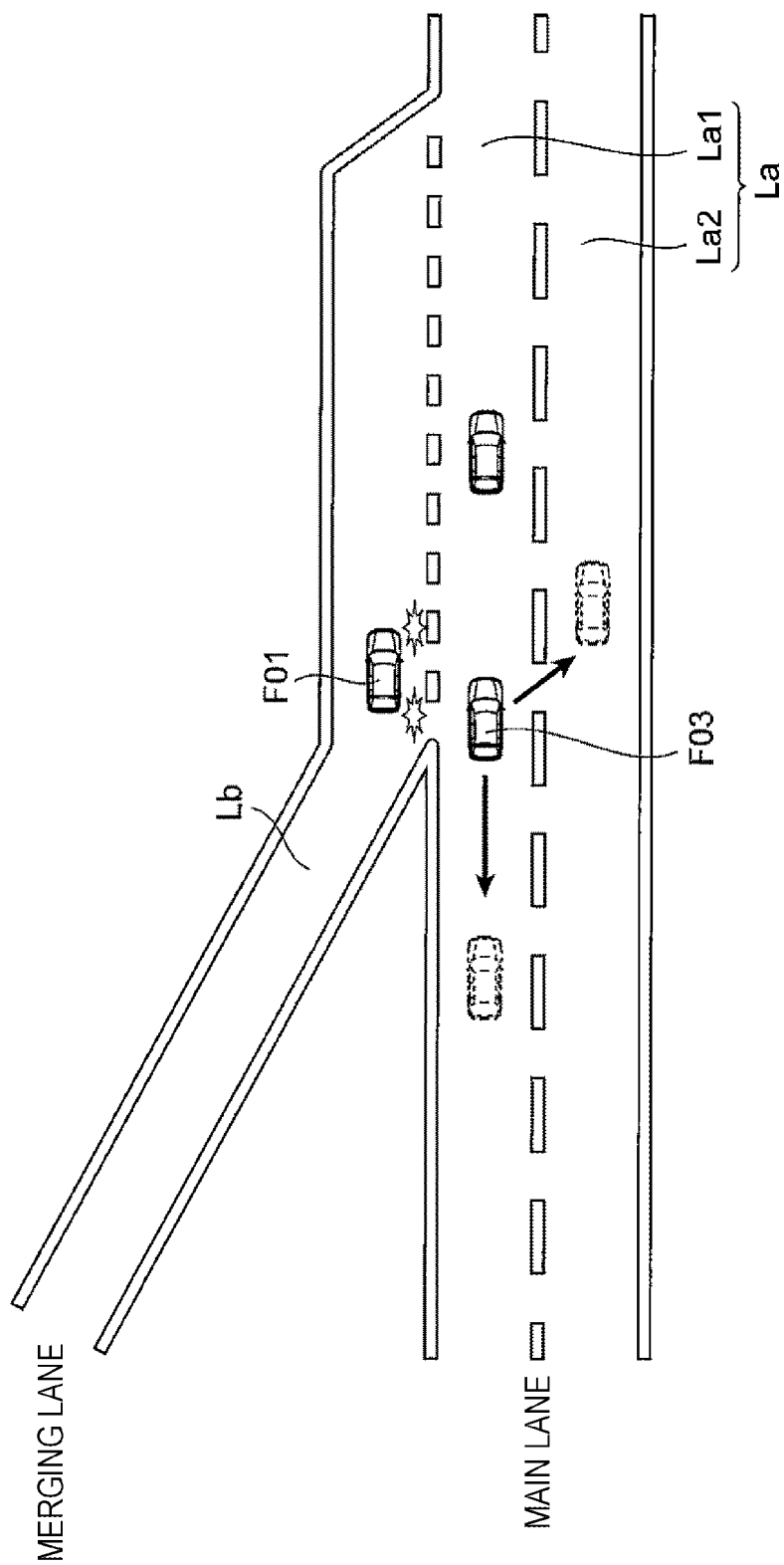
FIG. 4 is a diagram illustrating an example of ensuring a mergeable space by deceleration or lane change of a succeeding vehicle on a main lane according to the present invention.

Even in a case where there is no candidate space mergeable into the main lane La, there may be a case, as illustrated in FIG. 4, where an intention of lane change (merging) of the host vehicle F01 is demonstrated by a blinker (direction indicator) of the host vehicle F01, the vehicle-to-vehicle communication, or the like, and a mergeable space can be ensured by deceleration or lane change of the succeeding vehicle F03 on the main lane La. Therefore, in a case where it is difficult to find a merging space, the space that would be available as a mergeable space provided that the succeeding vehicle F03 decelerates or changes the lane, existing from a side closer to the merging start point Ps toward the rear side, is listed as a candidate merging space.

Figure 5:
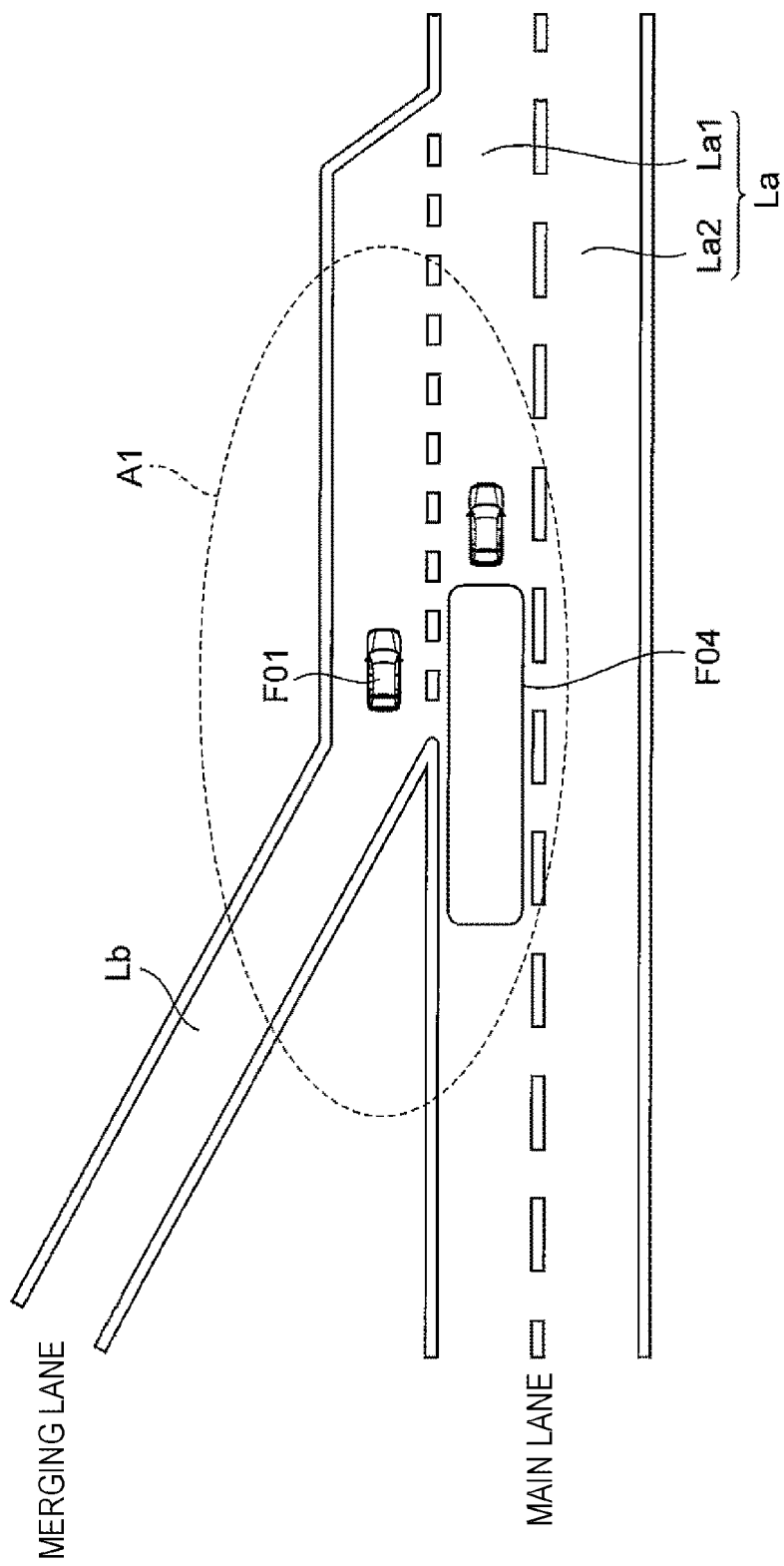
FIG. 5 is a diagram illustrating an example of verifying a mergeable space by an exterior recognition unit according to the present invention.

As illustrated in the example of FIG. 5, as the host vehicle F01 travels along the merging lane Lb, the candidate mergeable space on the main lane La gradually enters the sensing range A1 of an exterior recognition sensor. The exterior recognition unit 03 preferentially senses the candidate mergeable space F04 among the sensing range of the exterior recognition sensor and checks for the vehicles that could not be detected by vehicle-to-vehicle communication or road-to-vehicle communication, and for the other vehicles that were once present and sensed in the vicinity of the space F04 but might have their mergeable spaces changed due to acceleration and deceleration or lane change of the other vehicles. Thereafter, when it is confirmed that merging is continuously possible, the exterior recognition unit 03 determines a path for entering the mergeable space and performs vehicle control for the merging.

While the exterior recognition unit 03 senses and confirms the other vehicle existence of which is already known by communication (C2X), prioritized sensing is performed toward the other vehicle vicinity space such as the candidate space F04. In this, the frequency and resources of detection processing are changed to achieve sensing for this space more intensive than for the other vehicles. In the case of sensing the candidate space F04 with a camera image, for example, the imaging speed and image processing accuracy are increased.

Moreover, the other vehicle information acquisition unit 02 may change the degree of intensiveness of sensing in accordance with which of the following pattern is used to acquire the information of the other vehicle: (1) vehicle-to-vehicle communication (C2C) alone; (2) both the vehicle-to-vehicle communication and the road-to-vehicle communication (C2C+C2I); and (3) the road-to-vehicle communication (C2I) alone. For example, in a case where the information of the other vehicle is acquired by both (2) vehicle-to-vehicle communication and road-to-vehicle communication (C2C+C2I), information has higher accuracy compared with the case using (3) road-to-vehicle communication (C2I) alone. Accordingly, it is allowable to perform the sensing for the other vehicles with less intensiveness than the case of (3) road-to-vehicle communication (C2I) alone and perform the sensing for the vicinity region other than the other vehicles with more intensiveness.

In the case with the candidate space that can be available for merging provided that the succeeding vehicle on the main lane decelerates or changes lanes, traveling is continued diagonally rearward of the other vehicle located in immediate front of the space. Next, a lane-change signal is issued, and then, information is acquired from the host vehicle vicinity information management unit 04. In a case where it can be confirmed that the other vehicle behind the space will decelerate or change the lane to enable ensuring a mergeable space, a path for entering the space is determined and vehicle control for merging is executed.

In a case where the candidate mergeable space cannot be confirmed, a similar procedure is performed for a candidate space further behind.

Figure 6:
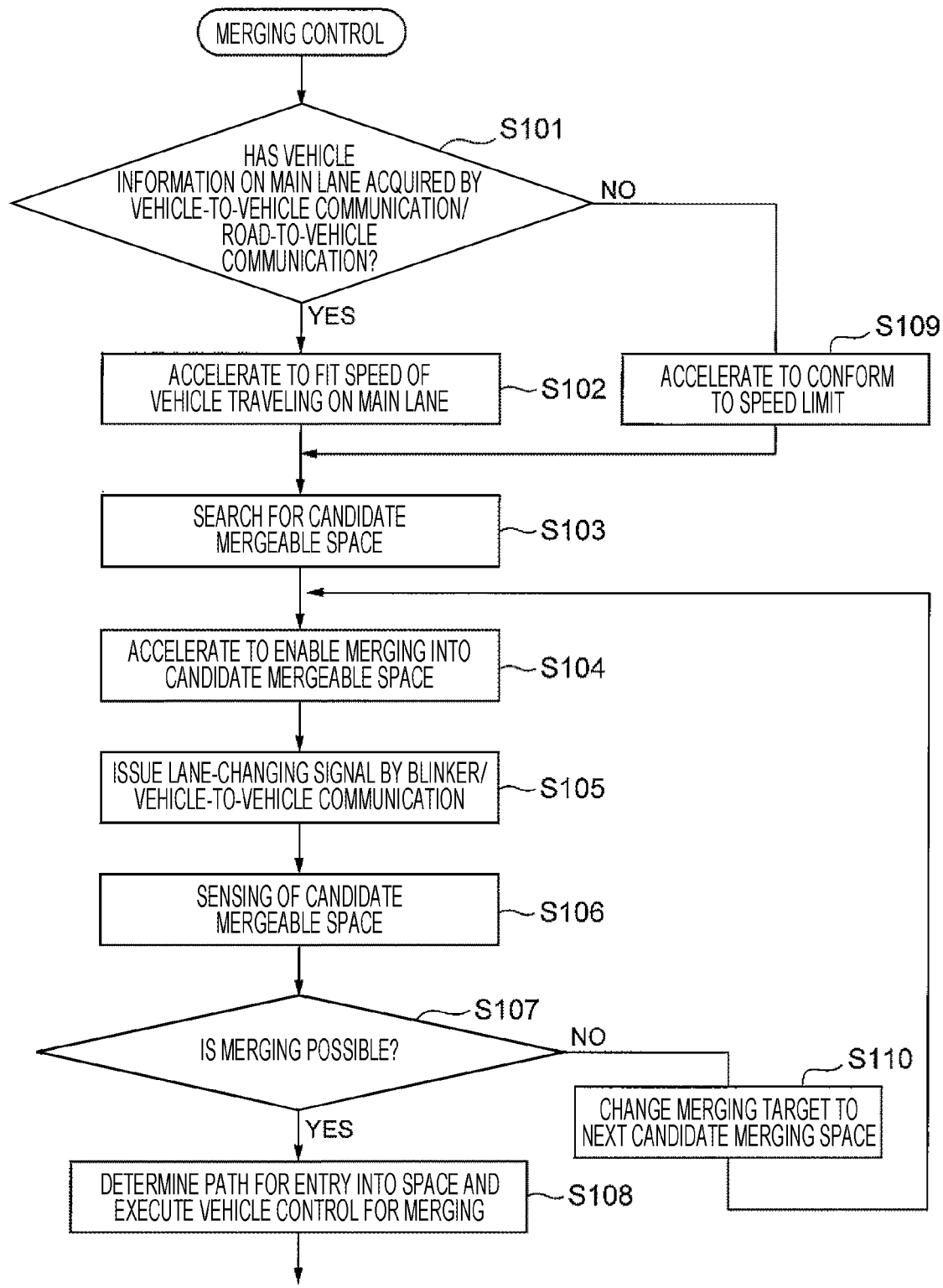
FIG. 6 is a diagram illustrating an example of a control flowchart at the time of merging from a merging lane to a main lane according to the present invention.

An example of the above control at merging from the merging lane to the main lane is illustrated in the flowchart of FIG. 6.

Determination is made whether the information of the other vehicle on the main lane La has been acquired by vehicle-to-vehicle/road-to-vehicle communication (S101). In a case where the information has been acquired (YES in S101), the vehicle is accelerated to fit the speed of the other vehicle traveling on the main lane La (S102). In a case where the information has not been acquired (NO in S101), the vehicle is accelerated to conform to the speed limit of the main lane La (S109).

Then, a search is performed to a candidate mergeable space (S103), and the vehicle is accelerated to enable merging into the candidate mergeable space (S104), a lane-changing signal is issued by a blinker/vehicle-to-vehicle communication (S105), while sensing a candidate mergeable space by the exterior recognition unit 03 (S106).

With a result of the sensing, it is determined whether merging is possible (S107). In a case where it is determined that merging is possible (YES in S107), vehicle control for merging into the mergeable space is executed (S108). In another case where it is determined that the merging is not possible (NO in S107), the merging target is changed to a next candidate mergeable space (S110), and the processing returns to S104 again.

According to the vehicle control device 01 of the present Example, a candidate mergeable space for the host vehicle is detected on the basis of the information of other vehicles in the vicinity acquired by the vehicle-to-vehicle communication and the road-to-vehicle communication, and the candidate mergeable space is verified by the exterior recognition using a sensor. With this configuration, it is possible in merging on a highway or the like not only to accelerate to an appropriate speed but also to grasp the action of the vicinity vehicles and thus confirm whether there is a space that makes safe merging possible.

Second Example

The lane change on the main lane can also be implemented with a control similar to the case of merging. An example of the specific control will be described below.

In the present Example, in a case where the other vehicle information acquisition unit 02 has acquired information of a plurality of other vehicles traveling lengthwise, that is, in the front-rear direction, the exterior recognition unit 03 senses an inter-other vehicle space between the plurality of other vehicles. For example, as illustrated in FIG. 7, in a case where the host vehicle F01 is present on the traveling lane La2 of the main lane La and the other vehicles F02 and F03 on a passing lane La1 of the lane change destination are present within the sensing range A1 of the exterior recognition unit 03, and in a case where the other vehicles F04 and F05 are outside the sensing range A1 of the exterior recognition unit 03, the information from the host vehicle vicinity information management unit 04 is used for sensing the other vehicles F02, F03, F04, and F05 and the road conditions on the passing lane La1.

Subsequently, it is examined whether there is a lane changeable space (inter-other vehicle space) on the passing lane La1. At that time, candidates are searched for in a direction from the other vehicle in a closer position within the sensing range A1 of the exterior recognition unit 03, immediately adjacent to the host vehicle, toward the other vehicle more distant within the sensing range A1 of the exterior recognition unit 03. In a case where there is a lane changeable space, the host vehicle is decelerated down to the speed that enables lane change to that space.

Figure 7:
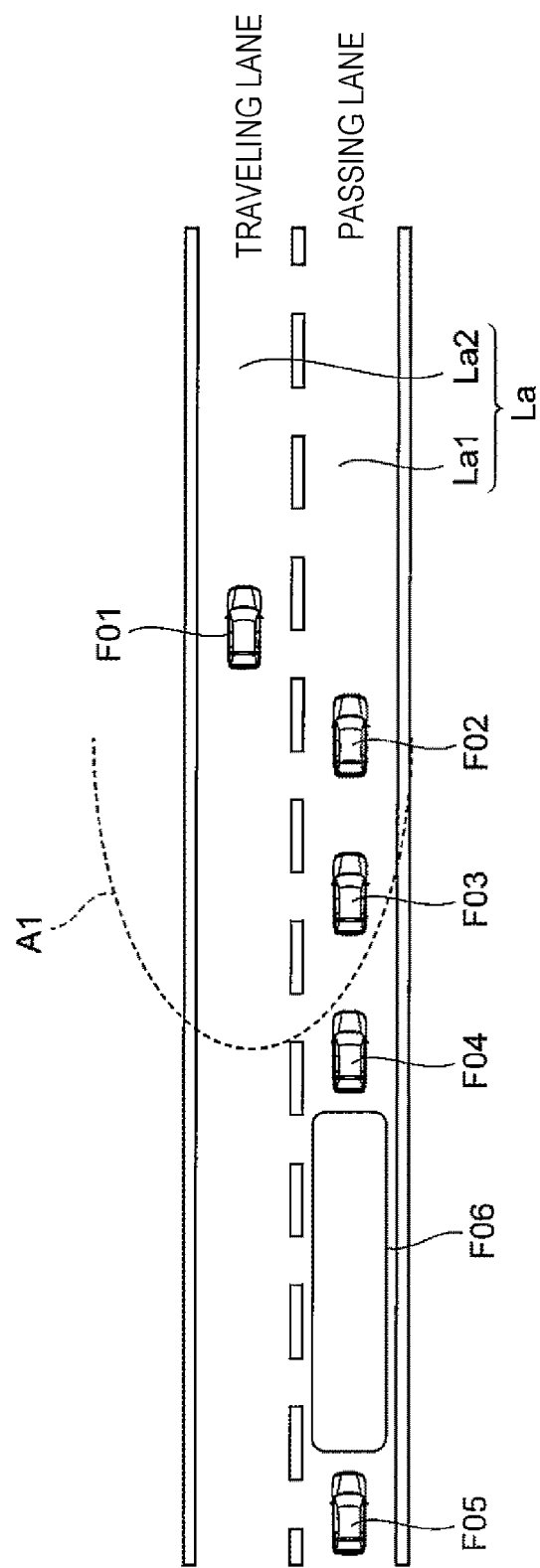
FIG. 7 is a diagram illustrating an example of a vehicle and a road condition at the time of lane change by the exterior recognition unit according to the present invention.

In the case of FIG. 7, there is no lane changeable space between the other vehicles F02 and F03 or between the other vehicles F03 and F04, and thus, the inter-other vehicle space F06 outside the sensing range A1 of the exterior recognition unit 03 becomes a candidate for the lane changeable space.

Figure 8:
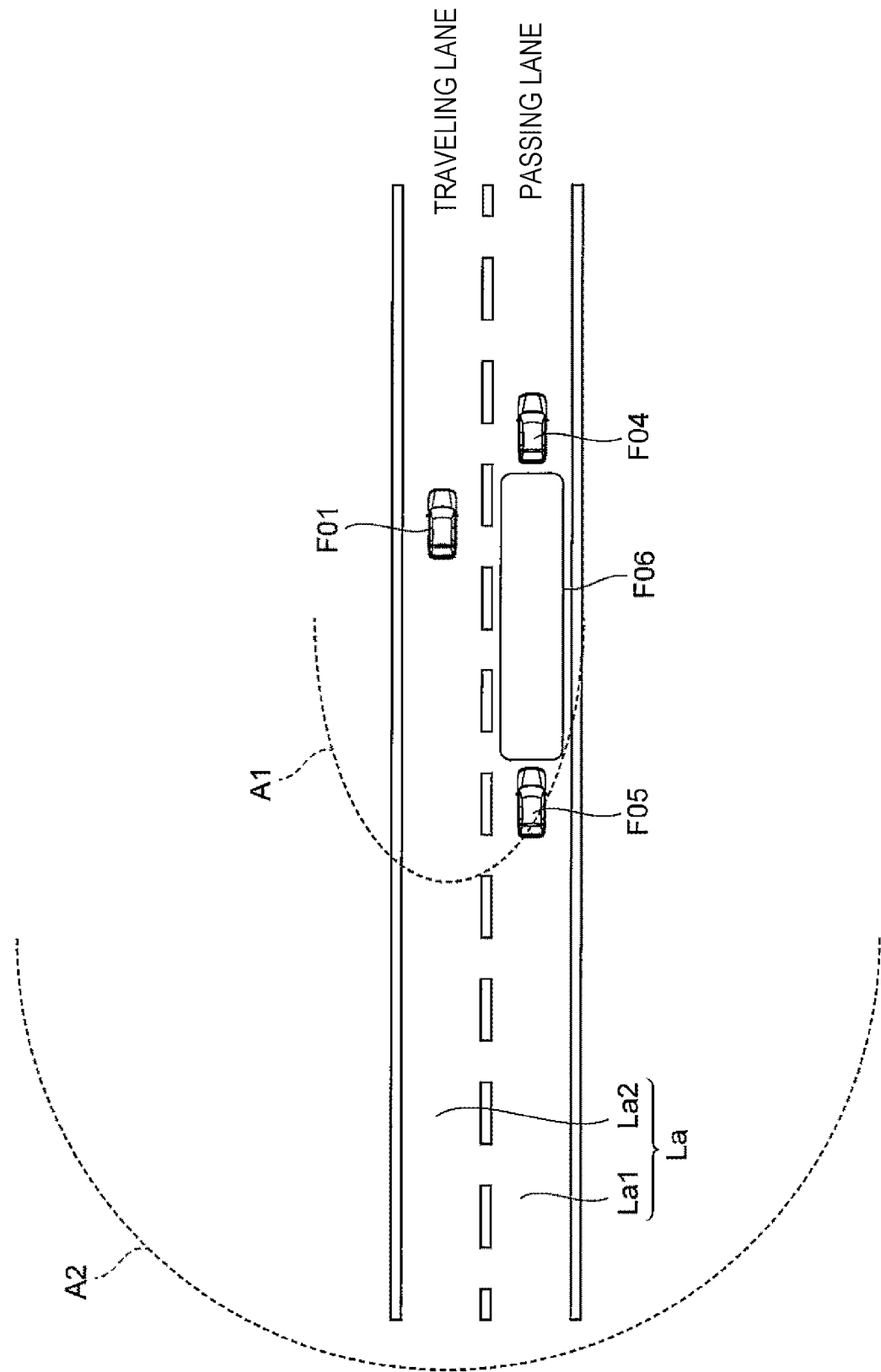
FIG. 8 is a diagram illustrating an example in which the exterior recognition unit according to the present invention verifies a lane changeable space.

The speed of the host vehicle F01 is adjusted so as to change the lane to the inter-other vehicle space F06. Preferential sensing is performed at a point where the inter-other vehicle space F06 as the lane changeable space as illustrated in FIG. 8 comes within the sensing range A1 of the exterior recognition unit 03. When it is confirmed that the inter-other vehicle space F06 as the lane changeable space can be ensured by the preferential sensing, a path to enter the inter-other vehicle space F06 is determined and vehicle control for lane change is executed.

In contrast, when it is not possible to confirm the inter-other vehicle space as the lane changeable space, the similar procedure is executed for a candidate space further backward.

As above, embodiments of the present invention have been described. The present invention is not limited to the above-described embodiments but may include various design modifications without departing from the spirit of the present invention described in claims. For example, the above-described embodiments give detailed explanation just to allow the present invention to be clearly understood. Therefore, the present invention is not limited to the case having all of components in the configuration. In addition, a part of configuration of an embodiment can be replaced with a part of configuration of another embodiment. A part or the configuration of another embodiment can be added to a certain embodiment. Furthermore, it is possible to modify a portion of the configuration of each of the embodiments, such as addition, deletion, and replacement from another configuration.

REFERENCE SIGNS LIST

01 vehicle control device
02 other vehicle information acquisition unit
03 exterior recognition unit
04 host vehicle vicinity information management unit
05 host vehicle action recognition unit
06 path generating unit

The invention claimed is:
1. A vehicle control system comprising:
a vehicle control device configured to acquire other vehicle information of a vehicle other than a host vehicle by cooperative awareness messaging; and
at least one sensor, including at least one of a camera or a radar, coupled to the vehicle control device and configured to:
perform recognition of an exterior vicinity of the host vehicle by sensing,
perform sensing of an other vehicle on the basis of the other vehicle information acquired by the vehicle control device, and
perform sensing of an other vehicle vicinity space surrounding the other vehicle on the basis of the other vehicle information acquired by the vehicle control device,
wherein the vehicle control device is further configured to, when the other vehicle information is acquired both by vehicle-to-vehicle communication and road-to-vehicle communication, perform sensing of the other vehicle at a lower degree of sensing intensity as compared to when the other vehicle information is acquired by the road-to-vehicle communication, and
wherein the vehicle control device is further configured to, when the other vehicle information is acquired by both vehicle-to-vehicle communication and road-to-vehicle communication, perform sensing of the other vehicle vicinity space at a higher degree of sensing intensity as compared to when the other vehicle information is acquired by the road-to-vehicle communication.

2. The vehicle control system according to claim 1, wherein the at least one sensor is further configured to detect an entry space into which the host vehicle enters on the basis of a result of sensing the exterior vicinity of the host vehicle.

3. The vehicle control system according to claim 1, wherein the at least one sensor is further configured to detect whether there is an obstacle to hinder entry of the host vehicle into the other vehicle vicinity space.

4. The vehicle control system according to claim 1, wherein the at least one sensor is configured to preferentially sense the other vehicle vicinity space rather than the other vehicle.

5. The vehicle control system according to claim 1, wherein in a case where the communication device has acquired information of a plurality of other vehicles traveling lengthwise, that is, in the front-rear direction, the at least one sensor is configured to sense an inter-other vehicle space between the plurality of other vehicles.

6. The vehicle control system according to claim 1, wherein the other vehicle is a vehicle traveling on a road to merge with a road on which the host vehicle travels.

7. The vehicle control system according to claim 1, wherein the other vehicle is a vehicle traveling on a lane adjacent to a lane on which the host vehicle travels.

8. The vehicle control system according to claim 1, wherein the communication device is configured to acquire the other vehicle information transmitted from the other vehicle by the vehicle-to-vehicle communication via the cooperative awareness messaging.

9. The vehicle control system according to claim 1, wherein the communication device is configured to acquire the other vehicle information transmitted from on-road equipment by the road-to-vehicle communication via the cooperative awareness messaging.

10. The vehicle control system according to claim 1, wherein the at least one sensor is further configured to determine a candidate entry space into which the host vehicle enters on the basis of the other vehicle information in accordance with a result of the sensing.

11. The vehicle control system according to claim 1, wherein the degree of sensing intensity includes an imaging speed, an imaging processing accuracy, or a frequency of detection.

* * * * *